000000000000000000000000000000000000

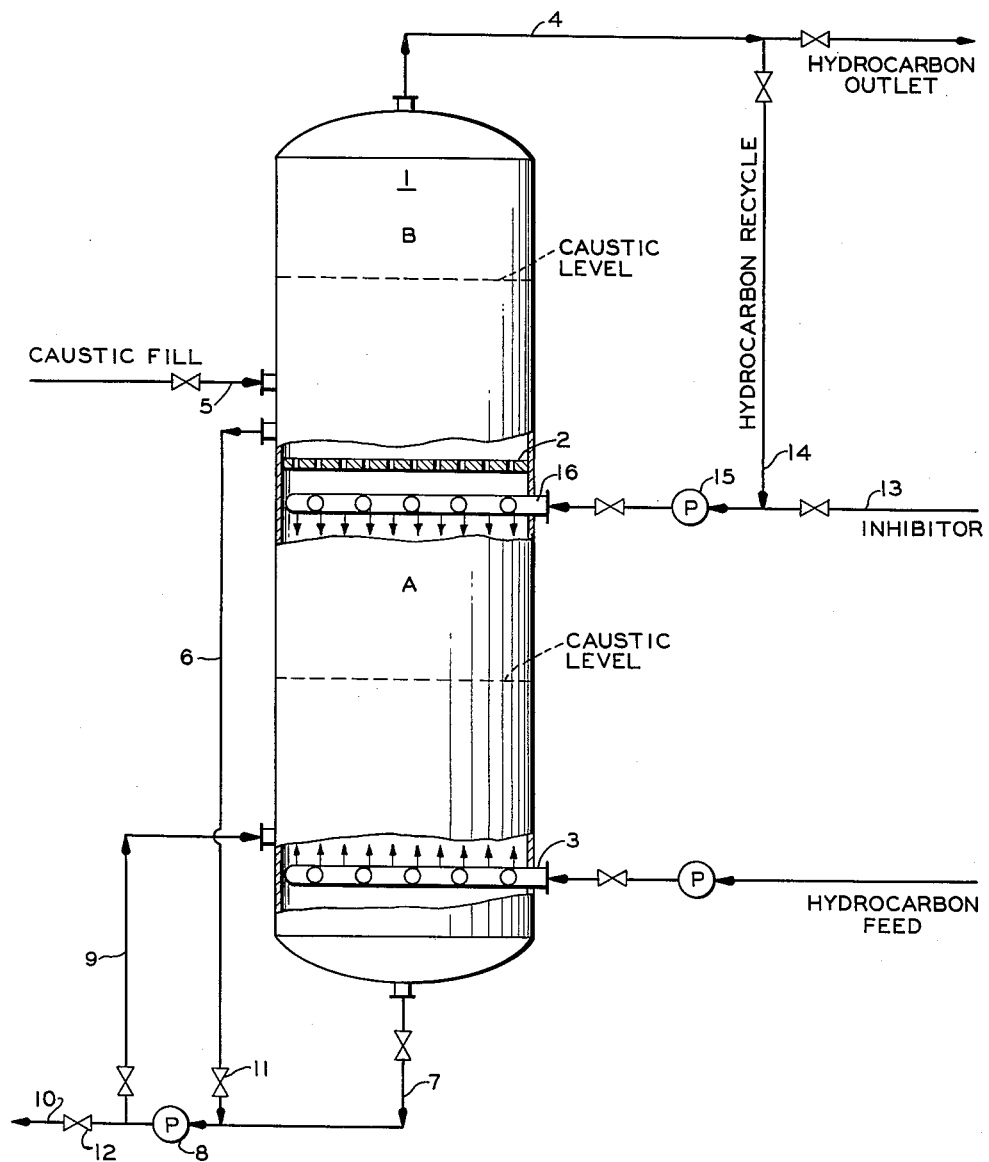

United States Patent Office 2,986,514
Patented May 30, 1961

2,986,514

PLURALITY STAGE TREATMENT

Carol C. Akers and Norris W. Mitchell, Phillips, Tex., assignors to Phillips Petroleum Company, a corporation of Delaware Filed Aug. 18, 1958, Ser. No. 755,500

11 Claims. (Cl. 208—284)

This invention relates to a plurality stage treatment and to an apparatus for effecting the same. In one of its aspects, the invention relates to the caustic treatment of a hydrocarbon in liquid phase by passing the said hydrocarbon upwardly through at least two separate bodies of caustic treating liquid at a rate of flow such that due to the upward momentum of the hydrocarbon an upper layer of caustic treating liquid is maintained above a perforated tray at all times. In another of its aspects, the invention relates to an apparatus which essentially consists of a vessel comprising a perforated tray section substantially at a mid-point thereof and means for passing a hydrocarbon upwardly from substantially the bottom of said vessel through said vessel and out substantially at the top thereof. In a more specific aspect of the apparatus, it comprises means for introducing caustic treating liquid into each of the sections of the vessel which are formed by incorporation of the perforated tray therein. In a more specific aspect of the method of the invention, provision is made for the injection of an inhibitor into the hydrocarbon after it has become disengaged from a body of caustic treating liquid in the bottom of the vessel but substantially before it enters into an upper body of caustic treating agent. Still further, the method and apparatus comprise steps and means which provide that used caustic treating agent from one section of the vessel is removed and passed to another section thereof.

It is known to treat hydrocarbons with various treating agents. Thus, hydrocarbons have been treated with acids of various kinds, for example, sulfuric acid. Also hydrocarbons have been treated with bases of various kinds, for example, caustic soda or solutions thereof.

It has now been found that a peculiarly effective method which is flexible in character and which permits variation of treatment from stage to stage, yet with economy of apparatus, such as vessels, pumps, etc., comprises the steps of passing the hydrocarbon or other liquid to be treated upwardly through a vessel through a level of treating agent in the bottom of said vessel and then upwardly through a perforated zone or tray in said vessel into another body of treating agent in said vessel and finally collecting the hydrocarbon or said other liquid from the top of said vessel. In this operation, the treating agent has a density greater than that of the liquid or hydrocarbon being treated. Thus, the hydrocarbon or liquid being treated passes upwardly through the treating agent and collects on top thereof. It has also been found that with this operation it is possible to treat the liquid or hydrocarbon by passing it through a first level or body of treating agent, such as sodium hydroxide solution, and collecting the treated hydrocarbon above the top of said solution, then adding to the once-treated hydrocarbon a desired inhibitor before its further treatment by passing the same upwardly through the perforated tray herein described into a second body or level of sodium hydroxide solution.

An object of this invention is to provide method and means for treating a liquid in a plurality of stages. It is another object of this invention to provide method and means for treating a hydrocarbon with a treating agent. It is a further object of this invention to provide method and means for treating a hydrocarbon with a caustic or other treating agent in solution in a plurality of stages and in such manner that desired inhibitor or other additive can be injected into the hydrocarbon between stages.

Other aspects, objects and the several advantages of the invention are apparent from a study of this disclosure, the drawing and the appended claims.

According to this invention, there are provided a method and apparatus for treating a hydrocarbon with a caustic solution, the steps of the method comprising passing the hydrocarbon upwardly through at least two separate bodies of caustic treating solution at a rate of flow such that an upper body of caustic treating solution is maintained above a perforated tray due to the momentum of the upwardly moving hydrocarbon passing through said tray; the apparatus of the invention comprising a vessel, divided into an upper and a lower section by means of a perforated tray, or equivalent partitioning means functioning as herein set forth and described, means for feeding liquid to be treated into the lower section of said vessel and means for removing treated liquid from the upper section of said vessel, means for introducing treating agent into the upper section of said vessel, means for removing used treating agent from the upper section of the vessel, means for feeding treating agent removed from the upper section of said vessel to the lower section of said vessel, means for removing treating agent from the lower section of said vessel and for withdrawal of treating agent from the system, means for recycling at least a portion of the treating agent removed from the lower section of said vessel back to said lower section of said vessel, and means, independent of said means for recycling, to control the rates of feed of treating agent to said vessel and withdrawal of treating agent from said vessel, thereby permitting recycling the contents of the lower section of said vessel at a rate higher than said rates of feed to and withdrawal from said system, and means for adding an inhibiting agent into an upper portion of said lower section of said vessel.

Although the invention is described primarily with respect to the caustic treating of hydrocarbon liquids, it will be apparent to one skilled in the art in possession of this disclosure that the method can be applied to the contacting of other materials.

Referring now to the drawing, the apparatus of the invention comprises a shell 1, a perforated tray 2, a means or distributor 3, for introducing liquid to be treated into the vessel, and an outlet 4 for removing treated liquid from the vessel. In a preferred form of the apparatus, provision is made for circulating treating agent. To this end, there are provided pipe 5 for feeding treating agent into the upper section of vessel 1, pipe 6 for removing treating agent from the upper section of vessel 1, pipe 7 for removing caustic treating agent from the lower section of vessel 1, pump 8 taking suction on pipes 6 and 7 and pipe 9 for discharging caustic treating agent removed from the upper section and from the lower section into the said lower section. A bleed-off pipe 10 is provided for removing caustic treating agent which is to be regenerated or discarded. A valve 11 is provided in pipe 6 and a valve 12 is provided in pipe 10 use of which will be evident from the description which follows later.

Pipes 13 and 14, pump 15 and distributor 16 are provided for diluting and injecting an inhibitor.

In operation according to one form of the method of the invention, stationary treating agent bodies can be maintained in each of the sections. However, in the preferred form of the invention, caustic treating agent is introduced continuously into the upper section and passed downwardly through pipe 6 controlled by valve 11 into pipe 7. Pump 8, which takes suction on pipes 6 and 7, pumps the caustic through pipe 9 into the lower section and from the lower section. By suitably adjusting valves 11 and 12, it becomes possible to circulate the caustic which is in the bottom of vessel 1 at one rate while feeding fresh caustic to the upper section of vessel 1 at another usually slower rate. The rate of withdrawal through valve 12 will be adjusted to correspond with the rate of feed through pipe 5, thus in the preferred embodiment to maintain constant the level of caustic in each of the sections of the apparatus.

Hydrocarbon is fed by means of distributor or pipe 3 into intimate contact with caustic in the bottom of vessel 1. After suitable contact with caustic, the hydrocarbon passes upwardly into space A. In this space, any entrained droplets of treating solution will drop out substantially completely. An inhibitor, in the example being described, N,N'-di-sec-butyl-p-phenylenediamine is passed by way of pipe 13 diluted with hydrocarbon from pipe 14 and pump 15 into the vessel through injector-distributor 16 and into intimate contact in admixture with the once-treated hydrocarbon which has just risen from the caustic treating agent in the bottom of the vessel. The mixture of hydrocarbon and inhibitor passes upwardly through the perforations in tray 2 into the caustic treating solution which is maintained thereabove by virtue of the motion of the hydrocarbon upwardly through the holes in the tray. After treatment with the caustic solution in the upper section of vessel 1, the hydrocarbon collects in section B and finally is removed from the vessel by way of pipe 4.

In the operation being described, the vessel is approximately 20 feet high and 5 feet in diameter; there are 700 gallons of caustic treating agent in each section. Fresh caustic treating agent is added by way of pipe 5 at the rate of 35 gallons per hour and used caustic reagent is removed by way of valve 12 and pipe 10 at the rate of 35 gallons per hour. The fresh caustic is an aqueous solution of NaOH of about 30 Baumé. The used caustic is substantially spent with respect to $H_2S$ and contains upwards of 40 to 50 volume percent acid oils. Pump 8 circulates the caustic in the bottom section of the vessel at the rate of 200 gallons per hour. The temperature in the vessel ranges from 90° F. to approximately 130° F. during a 24 hour period of operation. 700 gallons of hydrocarbon exist in each section of the tower, the sour hydrocarbon being added by way of distributor 3 at the rate of 4200 gallons per hour, and 4200 gallons per hour of sweet and gum-stable hydrocarbon are removed from the top of the vessel by way of pipe 4.

The inhibitor is added in an amount to exit in the treated product at 0.01 weight percent based on the hydrocarbon. Approximately 42 gallons per hour of treated hydrocarbon containing 2.6 pounds of inhibitor are pumped together into vessel 1 by means of pipes 13, 14, pump 15, and distributor-injector 16.

A gasoline, conventionally referred to as "light-cat-cracked gasoline" produced by catalytically cracking a virgin gas oil in a conventional fluid catalytic cracking operation, containing $H_2S$ and mercaptans as well as acid oils is in accordance with our invention, caustic washed to remove $H_2S$, most of the acid oils, as well as a portion of the lighter mercaptans. To this treated stream is added, at the rate of 0.01 weight percent, N,N'-di-sec-butyl-p-phenylenediamine. This admixture is then given a second caustic wash to remove the remainder of the acid oils. The so-treated product tests "sweet" and does not form gum during storage.

A second stream of the same "light-cat-cracked gasoline" is admixed with 0.01 weight percent N,N'-di-sec-butyl-p-phenylenediamine and is then caustic washed. The treated product is "sweet," but forms gum therein during storage.

A third stream of the same "light-cat-cracked gasoline" is admixed with 0.02 weight percent N,N'-di-sec-butyl-p-phenylenediamine and is then caustic washed. The treated product is "sweet," and does not form gum during storage.

A particularly preferred chemical gum inhibiting agent-sweetening agent comprises a phenylenediamine type inhibitor, and more particularly N,N'-di-secondary-butyl-p-phenylenediamine. However, it is understood that other phenylene diamine inhibitors can be used including N,N'-di-alkyl-p-phenylenediamines in which the alkyl groups contain from 1 to about 12 carbon atoms per molecule including such compounds as N,N'-di-isopropyl-p-phenylenediamine, N,N'-diamyl-p-phenylenediamine, N,N'-di-hexyl-p-phenylenediamine, etc., as well as those in which the alkyl groups are different as, for example, in such compounds as N-propyl-N'-butyl-p-phenylenediamine, N-butyl-N'-amyl-p-phenylenediamine, N-hexyl-N'-octyl-p-phenylenediamine, etc.

Since the above-type gum inhibitors are basic in their chemical reactions with acidic materials, such as $H_2S$ present in hydrocarbons, in order to minimize the quantity of gum inhibitor used, the $H_2S$ is treated out of the hydrocarbon, according to our invention by first washing the sour hydrocarbon.

In cracked gasolines and polymer gasolines in particular, gum forms very rapidly and degrades these products, and it is necessary to add gum inhibitor to the produced hydrocarbons as soon as practicable. When these gum inhibitors are added to the hydrocarbons prior to $H_2S$ removal, the $H_2S$ in the product uses up and destroys the gum-inhibiting property of a portion of the inhibitor, which is not desired.

We have found that we can save about fifty percent inhibitor by first treating out $H_2S$ in accordance with our invention, as compared to the prior art method of adding the gum inhibitor directly to an $H_2S$-containing hydrocarbon. In plant practice, it is desired to maintain about 0.01 weight percent, based on the hydrocarbon, of N,N'-di-sec-butyl-p-phenylene diamine gum inhibitor in the final product to prevent subsequent gum formation therein. When the gum inhibitor is added prior to $H_2S$ removal, it is necessary to add about 0.02 weight percent of the gum inhibitor to the hydrocarbon in order that subsequent gum formation does not occur.

It will be evident to one skilled in the art in possession of this disclosure that when the treating agent is of a density lower than that of the hydrocarbon or other liquid to be treated the flows can be reversed. That is, the treating agent can be passed upwardly through successive levels of the liquid to be treated and the liquid to be treated can be circulated as described herein for the caustic or other treating agent solution.

Reasonable variation and modification are possible within the scope of the foregoing disclosure, drawing and the appended claims to the invention, the essence of which is that a method and apparatus have been provided, substantially as described, for passing a hydrocarbon through a plurality of levels of the treating agent at a velocity sufficient to maintain an upper level of treating agent above a perforated zone or tray and in a preferred form in a manner such that inhibitor or other agent can be added intermediate the said levels.

We claim:

1. A two-stage caustic washing apparatus suitable for the washing of a hydrocarbon liquid, of density lower than a caustic washing liquid, in two stages of contacting with intermediate injection of inhibitor to liquid contacted once with a washing liquid and before a second contacting therewith which comprises a vessel, means for feeding a hydrocarbon liquid into a lower section of said vessel, means for removing said hydrocarbon from a point substantially at the top of said vessel, a perforated tray section at a level substantially at a mid-point of said vessel extending substantially horizontally across said vessel, dividing said vessel into said lower section and an upper section, means in communication with said means for removing said hydrocarbon from a point substantially at the top of said vessel for passing at least a portion of the removed hydrocarbon to a point at which an inhibitor is available in the apparatus and for causing admixture of the hydrocarbon and said inhibitor at said point, and means for introducing said inhibitor admixed with said hydrocarbon into said vessel below said tray but substantially in the top portion of said lower section, said tray having an overall cross-section of perforations therein such that the upward flow of hydrocarbon liquid will maintain on said tray a layer of said washing liquid.

2. A method of treating a liquid hydrocarbon with a caustic treating liquid in a treating zone which comprises providing in said zone a lower section and an upper section, separated by an intermediate separation zone having a plurality of open communications with both of said sections at a plurality of points, maintaining in the bottom of each of said sections a body of caustic treating liquid, passing said hydrocarbon upwardly through the body of caustic treating liquid in said lower section, adding a metal deactivator inhibitor to said hydrocarbon, then passing said hydrocarbon upwardly through said separate the body of caustic treating liquid in the bottom of said upper section, at a rate of flow at said points sufficient to prevent caustic treating liquid in the bottom of said upper section from flowing into said lower section, recovering treated hydrocarbon from above the caustic treating liquid in said upper section, continuously introducing caustic treating liquid into said upper section at a rate sufficent to maintain a body of caustic treating liquid therein, removing used caustic treating liquid from said body of said liquid in said upper section, continuously passing the removed used caustic treating liquid into said lower section and continuously removing caustic treating liquid from said lower section.

3. A method of treating a liquid hydrocarbon with a caustic treating liquid in a treating zone which comprises providing in said zone a lower section and an upper section, separated by an intermediate separation zone having a plurality of open communications with both of said sections at a plurality of points, maintaining in the bottom of each of said sections a body of caustic treating liquid, passing said hydrocarbon upwardly through the body of caustic treating liquid in said lower section, then passing said hydrocarbon upwardly through said separation zone through said communications upwardly through the body of caustic treating liquid in the bottom of said upper section, at a rate of flow at said points sufficient to prevent caustic treating liquid in the bottom of said upper section from flowing into said lower section and recovering treated hydrocarbon from above the caustic treating liquid in said upper section.

4. A method according to claim 3 wherein there is added a metal deactivator inhibitor to said hydrocarbon after it has passed through the body of caustic treating liquid in the bottom of said lower section and before it enters the body of caustic treating liquid maintained in the bottom of said upper section.

5. A method according to claim 3 wherein there is continuously introduced caustic treating liquid into said upper section at a rate sufficient to maintain a body of caustic treating liquid therein and wherein there is removed from the body of caustic treating liquid in said upper section used caustic treating liquid at a rate sufficient to supply optimum treating conditions in said section.

6. A method according to claim 5 wherein the removed caustic treating liquid is continuously introduced into said lower section at a rate sufficient to maintain a desired body of treating liquid therein and wherein used caustic treating liquid is continuously removed from said lower section at a rate sufficient to maintain desired treating conditions therein.

7. A method for treating a liquid to be purified with a liquid treating agent which comprises passing the liquid to be purified into and upwardly through a body of a treating agent, substantially immiscible with and of specific gravity greater than said liquid to be purified, in a lower section in a treating zone then passing said liquid to be purified upwardly through a section of restricted cross-section into an upper section of said zone into intimate contact with and through another body of a liquid treating agent, substantially immiscible with and of specific gravity greater than said liquid to be purified, recovering the purified liquid from on top of said another body of liquid treating agent and maintaining said another body of liquid treating agent above said section of restricted cross-section by passing said liquid to be purified upwardly from the lower section through said section of restricted cross-section into the upper section at a velocity sufficient to prevent the agent in the upper section from flowing downwardly through said section of restricted cross-section.

8. The treatment of a hydrocarbon in a plurality of stages with a liquid treating agent in each stage which comprises providing a vessel, partitioning said vessel into an upper and a lower section by a perforated tray, feeding said hydrocarbon into the lower section of said vessel into and through a body of treating agent provided in said lower section, then upwardly through said perforated tray into and through a body of treating agent provided above said tray and maintained above said tray by feeding the hydrocarbon to and upwardly through said vessel at a rate such that as it passes through the perforations in said tray it prevents downward flow through said tray of the treating agent thus maintained above said tray, passing the hydrocarbon through said treating agent above said tray and finally removing said hydrocarbon from said vessel from above said treating agent above said tray, feeding treating agent to said vessel at a controlled rate at a level above said tray, removing used treating agent at a controlled rate from the body of treating agent above said tray, feeding removed treating agent into the body of treating agent in said lower section, removing used treating agent from said lower section at a controlled rate, cycling at least a portion of treating agent removed from said lower section back to said lower section at a controlled rate, withdrawing from the system at a controlled rate used treating agent removed from said lower section, the rates of feed of treating agent to the system and withdrawal of used treating agent from the system being substantially the same and the rate of cycling of used treating agent from said lower section back to said lower section being independent from the said rates of feed and withdrawal of treating agent.

9. A method according to claim 8 wherein the rate of removal from and cycling back to said lower section of the treating agent is substantially higher than said rates of feed to and withdrawal from the system of treating agent.

10. An apparatus according to claim 1 wherein means are provided for removing caustic from the lower portion of the upper section and feeding it to the lower portion of the lower section of the vessel.

11. An apparatus according to claim 10 wherein means are provided for feeding caustic to the upper section of the vessel and wherein means are provided for removing spent caustic from the lower portion of the lower section of the vessel.

References Cited in the file of this patent

UNITED STATES PATENTS

| | | |
|---|---|---|
| 2,215,359 | Livingston et al. | Sept. 17, 1940 |
| 2,634,231 | Johnstone | Apr. 7, 1953 |
| 2,717,854 | Felix | Sept. 13, 1955 |
| 2,729,592 | Niehaus | Jan. 3, 1956 |
| 2,746,846 | Grunewald et al. | May 22, 1956 |
| 2,781,296 | Brown et al. | Feb. 12, 1957 |
| 2,853,428 | Parkin | Sept. 23, 1958 |

UNITED STATES PATENT OFFICE

CERTIFICATE OF CORRECTION

Patent No. 2,986,514

May 30, 1961

Carol C. Akers et al.

It is hereby certified that error appears in the above numbered patent requiring correction and that the said Letters Patent should read as corrected below.

Column 5, line 24, for "separa-" read -- separation zone through said communications upwardly through --.

Signed and sealed this 6th day of February 1962.

(SEAL)
Attest:

ERNEST W. SWIDER
Attesting Officer

DAVID L. LADD
Commissioner of Patents